United States Patent
He et al.

(10) Patent No.: US 7,894,550 B2
(45) Date of Patent: Feb. 22, 2011

(54) METHOD, APPARATUS, AND SYSTEM FOR SOURCE CODING WITH ITERATIVE SIDE INFORMATION GENERATION AND DECODING PROCESS

(75) Inventors: Dake He, Yortown Heights, NY (US); Ashish Jagmohan, Irvington, NY (US); Ligang Lu, New York, NY (US); Vadim Sheinin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 11/621,882

(22) Filed: Jan. 10, 2007

(65) Prior Publication Data
US 2008/0165853 A1    Jul. 10, 2008

(51) Int. Cl.
*H04L 27/00* (2006.01)
*H04N 7/00* (2006.01)
(52) U.S. Cl. ................. 375/316; 375/240.01
(58) Field of Classification Search ............... 375/316, 375/340, 343, 240.01, 130, 140, 149
See application file for complete search history.

(56) References Cited

U.S. PATENT DOCUMENTS

2008/0031344 A1*   2/2008   Lu et al. ............... 375/240.19

OTHER PUBLICATIONS

Adikari et al., "A Sequential Motion Compensation Refinement Technique for Distributed Video Coding of Wyner-Ziv Frames", Proc. IEEE International Conference on Image Processing, 2006, p. 597-600.*
Anshul Sehgal et al., "Wyner-Ziv Coding of Video: An Error-Resilient Compression Framework", IEE Transactions on Multimedia, vol. 6 No. 2, Apr. 2004.

* cited by examiner

*Primary Examiner*—Kevin M Burd
(74) *Attorney, Agent, or Firm*—Scully, Scott, Murphy & Presser, P.C.; Stephen C. Kaufman, Esq.

(57) ABSTRACT

A method and apparatus for decompressing data in a data-compression system with decoder-only side information is provided. In one aspect, the method comprises generating side information using a source reconstruction and decoding using the generated side information to generate a new source reconstruction. The method further includes iterating the steps of generating and decoding, the generating step using at least the new source reconstruction output by the previous decoding step, and the decoding step using the side information output by the previous generating step. The method may stop the iteration when one or more predetermined criteria are met.

20 Claims, 2 Drawing Sheets

METHOD, APPARATUS, AND SYSTEM FOR SOURCE CODING WITH ITERATIVE SIDE INFORMATION GENERATION AND DECODING PROCESS

FIELD OF THE INVENTION

The present invention relates generally to methods and apparatuses for decompression in a data compression system with decoder side information. More specifically, the present invention relates to a decompression method, apparatus and system using iterative process in decode-only side information generation and decoding.

BACKGROUND OF THE INVENTION

Data encoding reduces data required to represent various information such as text, graphics, video and audio. In common data coding or compression schemes, an encoder uses information to compress or encode data and a decoder employs the same information to decompress or decode the data. FIG. 1 illustrates a common coding method and system such as Moving Picture Experts Group (MPEG)/H.264 in which the side information is available to both the encoder 102 and the decoder 104. For instance, the encoder 102 compresses data X using the side information Y and the decoder 104 uses the same side information Y to decode the data it receives into X'. Other coding methods use decoder only side information to decompress data. Wyner-Ziv coding scheme is one such example. FIG. 2 illustrates a coding method and system with decoder only side information such as the Wyner-Ziv coding. The encoder 202 codes data X and is sent to a receiver. The receiving end generates side information Y at 206 and the decoder 204 decodes the data X into X' using the side information Y.

Data-compression with decoder-only side information is of interest in several applications including, but not limited to, low complexity encoding of media, data communication over error-prone channels, distributed source coding for sensor networks, etc. In a practical system of source coding with decoder-only side information, the encoder does no have knowledge of the side information which the decoder will use in decoding. On one hand the encoder may use a rate that is too low and cause decoding failure. Rate refers to the amount of encoded data (e.g., the amount of bits) used per unit of time (e.g., seconds) to represent continuous medium such as video and audio. On the other hand, if the encoder uses a rate that is too high, the system will not achieve the best attainable compression performance.

Currently, data-compression systems with decoder only side information employ non-iterative side information generation process and decoding process in decompression. These methods are described in B. Girod, A. Aaron, S. Rane, and D. Rebollo-Monedero, "Distributed video coding," Proceedings of the IEEE, vol. 93, pp. 71-83, January 2005; A. Majumdar, J. Chou, and K. Ramchandran, "Robust distributed video compression based on multilevel coset codes," in Conference record of ASILOMAR, 2003, pp. 845-849; H. Wang and A. Ortega, "WZS: Wyner-Ziv scalable predictive video coding," in Picture Coding Symposium, 2004; Q. Xu and Z. Xiong, "Layered Wyner-Ziv video coding," in Proc. Video Coding and Image Processing, 2004; A. Sehgal, A. Jagmohan, and N. Ahuja, "Wyner-ziv coding of video: an error-resilient compression framework," IEEE Transactions on Multimedia, vol. 6, pp. 249-258, April 2004; and A. Sehgal, A. Jagmohan, and N. Ahuja, "Scalable video coding using Wyner-Ziv codes," in Picture Coding Symposium, 2004. In these systems, the decoder generates the side information and then uses it to decode the received signal. This solution is not robust since if the encoder has not transmitted enough bits to recover the source from the decoder side information incorrect decoding occurs. In addition, the incorrect decoding compounds into poor decoder reconstruction quality and error propagation in future reconstructions. Known techniques address this problem by providing a feedback channel used to inform the encoder if there is decoding failure so that the encoder can transmit more information (or bits) to the decoder until the data is decoded successfully. However, this solution is not feasible in practice, since the requirement of a feedback channel is usually unrealistic and expensive.

BRIEF SUMMARY OF THE INVENTION

A method and apparatus for decompression in a data-compression system with decoder-only side information is provided. In one aspect, the method comprises generating side information using a source reconstruction and decoding using the generated side information to generate a new source reconstruction. The method further includes iterating the steps of generating and decoding, the generating step using at least the new source reconstruction output by the previous decoding step, and the decoding step using the side information output by the previous generating step. The method may stop the iteration when one or more predetermined criteria are met.

A method of decoding data with decoder-only side information in another aspect may include generating side information using at least reconstructed source data adjacent to source data being decoded, decoding the source data using the generated side information to reconstruct the source data, using at least the reconstructed source data from the previous decoding step to generate new side information, decoding using at least the new side information to generate updated source data, and repeating the steps of using the reconstructed source data and decoding using the new side information until one or more predetermined criteria is met.

A system for decoding data in a data-compression system with decoder-only side information may include a side information generator operable to iteratively generate side information using at least a source reconstruction, and a decoder operable to iteratively decode using the generated side information to generate a new source reconstruction, wherein the side information generator is further operable to generate the side information using at least a source reconstructed from the previous iteration and the decoder is operable to decode using the side information generated by the previous generating step.

Further features as well as the structure and operation of various embodiments are described in detail below with reference to the accompanying drawings. In the drawings, like reference numbers indicate identical or functionally similar elements.

DETAILED DESCRIPTION

An exemplary embodiment the present invention utilizes a source reconstruction, which may contain some decoding errors, to generate improved side information, which is then used to perform another decoding of the source, leading to a source reconstruction of better quality or a source reconstruction with fewer errors. This process of generating improved side information and reconstructing better source data is carried out iteratively until the decoding errors are reduced to zero or a minimum or a maximum number of iterations is reached.

Figure 1:
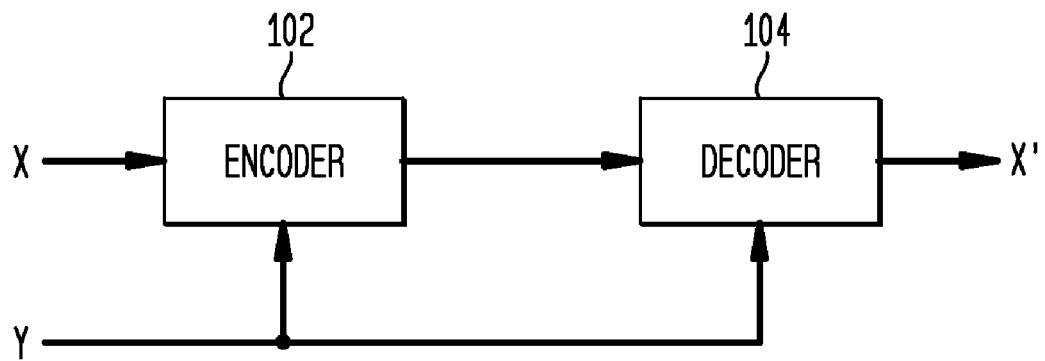
FIG. 1 illustrates a common coding method and system.
Figure 2:
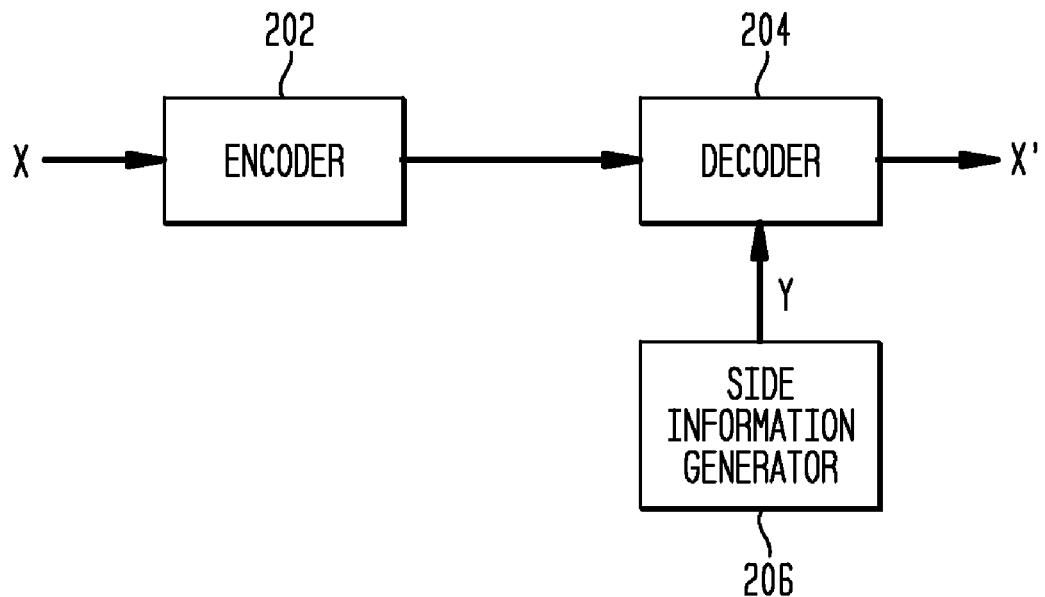
FIG. 2 illustrates coding method and system with decoder only side information.
Figure 3:
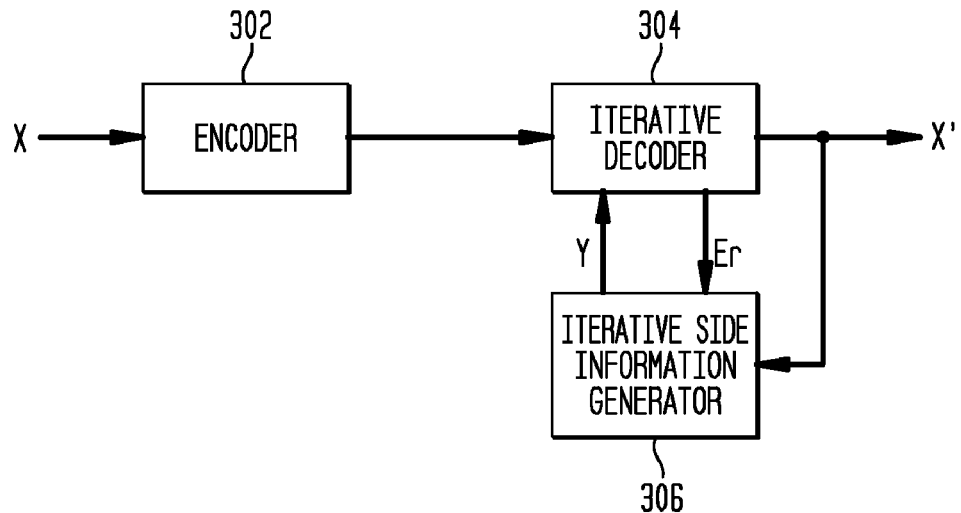
FIG. 3 illustrates a method and system with iterative side information generation and iterative decoding in one embodiment of the present disclosure.

FIG. 3 illustrates a method and system with iterative side information generation and iterative decoding in one embodiment of the present disclosure. An encoder 302 codes data, for example, shown as X. In this example, the data is a video source. But the data may be in other form of source, such as text, audio or other data. The encoder 302 may use any encoding algorithms such as a Wyner-Ziv encoder. In the preferred embodiment of Wyner-Ziv video coding, to encode a video frame, the encoder first partitions the frame into blocks and transforms a block of pixels into discrete cosine transform (DCT) coefficients, then applies scalar quantization to compress the data, and finally encodes the quantized coefficients using low density parity check (LDPC) coding. The encoder 302 may use any other known or will-be-known methods to code the data.

At a receiving end, a side information generator 306 generates side information shown as Y. In one aspect, the side information can be regarded as a noise version of the data being decoded. It serves as a reference in decoding the received symbols. In an exemplary embodiment, generating the side information may start with the adjacent reconstructed frames available at the decoder. For example, to generate a first version of the side information, one or more of the previously reconstructed frames adjacent to the frame being decoded are input to the side information generator 306. Any number of adjacent frames may be input, for example, 2 or 3 frames but not limited to such. The side information generator 306 in response outputs the first version of side information. In one embodiment, side information generator 306 performs a first motion estimation on the adjacent reconstructed frames to establish the correspondence of the pixels between these adjacent frames through the motion vectors. Then motion compensated interpolation and/or extrapolation is used to generate an estimate of the current frame being decoded. This estimate is the first version of the side information. In one embodiment, in cases in which there are empty pixel positions in the generated side information frame, similarity measures using local statistic features such as cross-correlation and variances are employed to determine the pixel value at these positions. A decoder 304 uses the generated side information to decode or reconstruct the data encoded by the encoder 302. If Wyner-Ziv video coding is used, the decoder preferably employs low-density parity-check (LDPC) decoding. The decoder uses the side information from 306 to decode the received symbols and reconstructs the current frame. In one embodiment of the iterative decoding of the present disclosure, the decoder 304 may also produce potential decoding error flags based on the confidence, for example, the log-likelihood ratio, for each coefficient in LDPC decoding. If a coefficient is decoded with a log-likelihood higher than a prescribed threshold, the error flag for that coefficient is not set. Otherwise it is set. In one embodiment, the threshold used in flagging errors can be learned from training data, and/or adjusted dynamically during the course of iterative decoding. The number of the decoding errors and the executed number of iterations are checked to see if the stop criterion is met. If the number of decoding errors has been reduced to the minimum or the maximum number of iteration has been reached, iterative decoding stops. Otherwise the decoding error information and the reconstructed frame are sent to the side information generator 306 for the next iteration. The side information generator 306 uses the decoding error flags, the reconstructed current data, and other adjacent reconstructed data to generate a new and improved version of the side information. In turn the decoder 304 uses the regenerated side information to decode and reconstruct the data again.

In an exemplary embodiment of the present disclosure, the decoder 304 decodes video frames, audio frames and the like. In one embodiment, if the data decoded is a video frame, the side information generator generates the new side information by, for example, the following steps. The side information generator establishes the correspondence between the coefficients in the current frame and adjacent reconstructed frames using motion estimation. Then, the side information generator replaces each coefficient that is marked as potential error with a value determined by motion compensated interpolation/extrapolation to generate a new version of the side information. In one embodiment, the side information generator may use features such as the spatial correlations in the possibly erroneous reconstruction.

In another embodiment the side information generator may use the likelihood probabilities output by the LDPC decoder in conjunction with the flagged coefficients to perform motion estimation as follows. For each block of pixels, each combination of the most probable values of flagged coefficients is used for motion estimation with respect to previously decoded frames. The combination that yields the lowest motion estimation error is set as the true value of the flagged coefficients. This process generates a preliminary side information frame. The preliminary frame may be further refined by the use of spatial and temporal correlations in which the values of the spatial and temporal neighbors are used to improve the estimation of the flagged coefficients.

The encoder, decoder, and side information generator of the present disclosure may be implemented as any one or more of a device, a component of a device, software program or system, or the like that perform at least the functions described herein, and may be embodied as software, hardware, firmware, electronic circuitry, etc.

Figure 4:
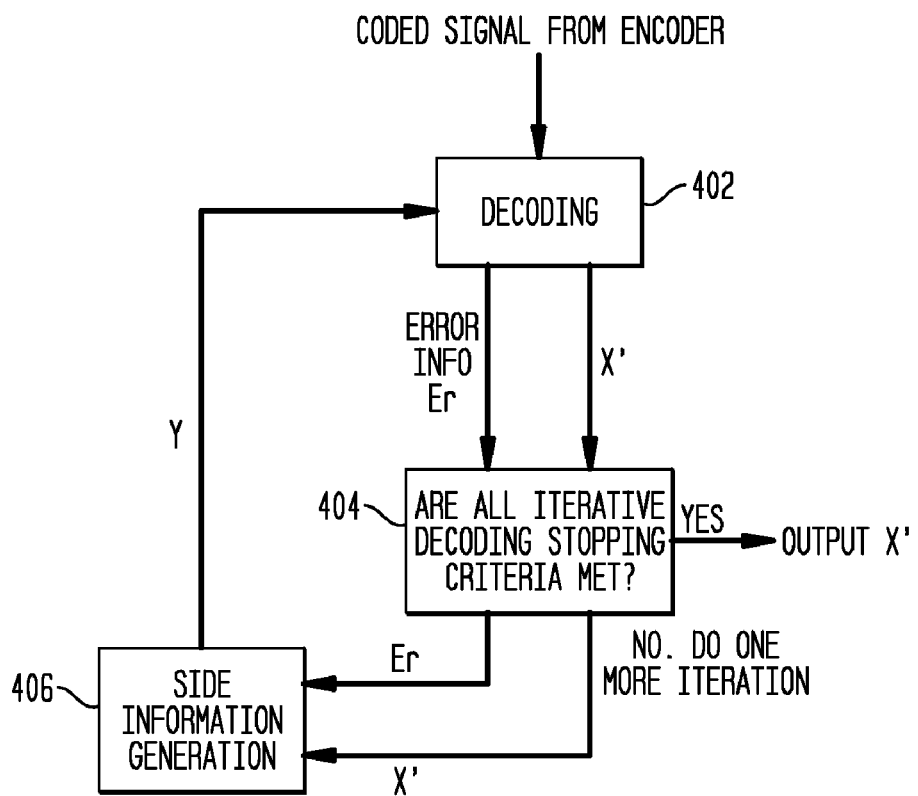
FIG. 4 is a flow diagram illustrating an iterative process of decoding and side information generation in one embodiment of the present disclosure.

FIG. 4 is a flow diagram illustrating an iterative process of decoding and side information generation in one embodiment of the present disclosure. At 402, coded signal from an encoder is decoded using side information generated by the side information generator 406, for example, as described in the above paragraphs. At 404, it is determined whether one or more criteria for stopping the iteration are met. In an exemplary embodiment, the stopping criterion is met if the decoding error is reduced to the minimum or the maximum number of iterations has been reached. If the criterion is not met, a new version of the side information is generated using the reconstructed data at 406. This regenerated side information is fed to the decoder to repeat the process of decoding at 402.

The present invention improves the system performance and robustness by significantly reducing the possibility of decoding failure and reducing decoding errors to a minimum in the case that decoding failure does occur. The invention makes data-compression with decoder only side information feasible because it allows the use of imperfect rate estimation at the encoder and eliminates the need for a feedback channel.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the present application may include and may be included within fixed and portable devices such as desktop, laptop, server, personal digital assistants (PDAs), cell phones, wireless communication devices, and the like.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A decompression method for a data-compression system with decoder-only side information comprising:
   generating side information using a source reconstruction by a processor;
   decoding a current frame using the generated side information to reconstruct the current frame;
   regenerating the side information by using at least the reconstructed current frame;
   redecoding the current frame using the regenerated side information to reconstruct the current frame again; and
   iterating the steps of regenerating and redecoding until one or more predetermined criteria are met.

2. The method of claim 1, wherein data to be decoded is a video frame, and the side information is generated by a process of motion-estimation between the reconstructed current frame and previously decoded video frames.

3. The method of claim 2, wherein the step of decoding includes at least decoding on a Wyner-Ziv code using the side information.

4. The method of claim 3, wherein the step of generating further includes at least using spatial correlations in the reconstructed current frame.

5. The method of claim 1, wherein the predetermined criteria include maximum number of iterations, whether decoding confidence level reached a predetermined threshold, number of decoding errors, or combinations thereof.

6. A method of decoding data with decoder-only side information comprising:
   generating, using a processor, side information using at least reconstructed source data adjacent to source data being decoded;
   decoding a current frame of the source data using the generated side information to reconstruct the current frame;
   using at least the reconstructed current frame to regenerate the side information;
   decoding using the regenerated side information the current frame; and
   repeating the steps of using at least the reconstructed current frame, and decoding using the regenerated side information until one or more predetermined criteria is met.

7. The method of claim 6, further including:
   generating a confidence level associated with the decoding step; and
   the step of repeating includes at least repeating the steps of generating a confidence level, using at least the reconstructed current frame, and decoding using the new side information until predetermined criteria is met.

8. The method of claim 6, wherein the predetermined criteria include at least where decoding confidence level reached a predetermined threshold, maximum number of iterations, number of decoding errors, or combinations thereof.

9. The method of claim 8, wherein the predetermined threshold is learned from training data.

10. The method of claim 8, wherein the predetermined threshold is adjusted dynamically during the repeating of the generating and decoding steps.

11. The method of claim 6, wherein the step of using at least the reconstructed current frame to regenerate the side information includes using at least the reconstructed current frame and reconstructed source data adjacent to the current frame being decoded, to regenerate the side information.

12. The method of claim 6, wherein the step of using at least the reconstructed current frame to regenerate the side information includes using at least the reconstructed current frame, error information from the previous decoding step and reconstructed source data adjacent to the current frame being decoded, to regenerate the side information.

13. The method of claim 6, wherein the source data include audio data, video data, or combination thereof.

14. The method of claim 6, wherein generating side information further includes:
   determining correspondence between coefficients in the current frame being decoded and the reconstructed source data adjacent to the current frame being decoded; and
   replacing each coefficient that is marked as potential error with a value determined by motion compensated interpolation or extrapolation to regenerate the side information.

15. The method of claim 14, wherein the generating side information further includes:
   using spatial correlations to further refine the new side information.

16. The method of claim 14, further including:
   using one or more local statistic features to determine pixel values for empty pixel positions in a frame associated with the generated side information.

17. The method of claim 16, wherein the one or more local statistic features includes cross-correlation, variances, or combination thereof.

18. A system for decoding data in a data-compression system with decoder-only side information comprising:
   a processor;
   a side information generator operable to execute on the processor and further operable to iteratively generate side information using a source reconstruction; and
   a decoder operable to decode a current frame using the generated side information to reconstruct the current frame, wherein the side information generator is further operable to regenerate the side information using at least the reconstructed current frame and the decoder is further operable to decode the current frame using the regenerated side information.

19. The system of claim 18, wherein the side information generator is further operable to generate the side information using at least the reconstructed current frame, reconstructed source adjacent to the current frame being decoded, and error information from the previous decoding step of the current frame, to regenerate the side information.

20. A program storage device readable by machine, tangibly embodying a program of instructions executable by the machine to perform a method of decompressing for a data-compression system with decoder-only side information comprising:

generating side information using a source reconstruction by a processor;

decoding a current frame using the generated side information to reconstruct the current frame;

regenerating the side information by using at least the reconstructed current frame;

redecoding the current frame using the regenerated side information to reconstruct the current frame again; and iterating the steps of regenerating and redecoding until one or more predetermined criteria are met.

* * * * *